Sept. 19, 1961 F. S. SILLARS 3,000,338
METHOD AND APPARATUS FOR SOLDERING CANS
Filed Oct. 15, 1957 3 Sheets-Sheet 1
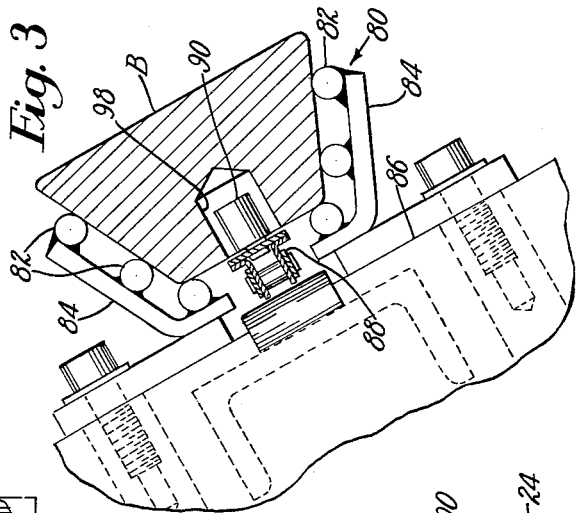
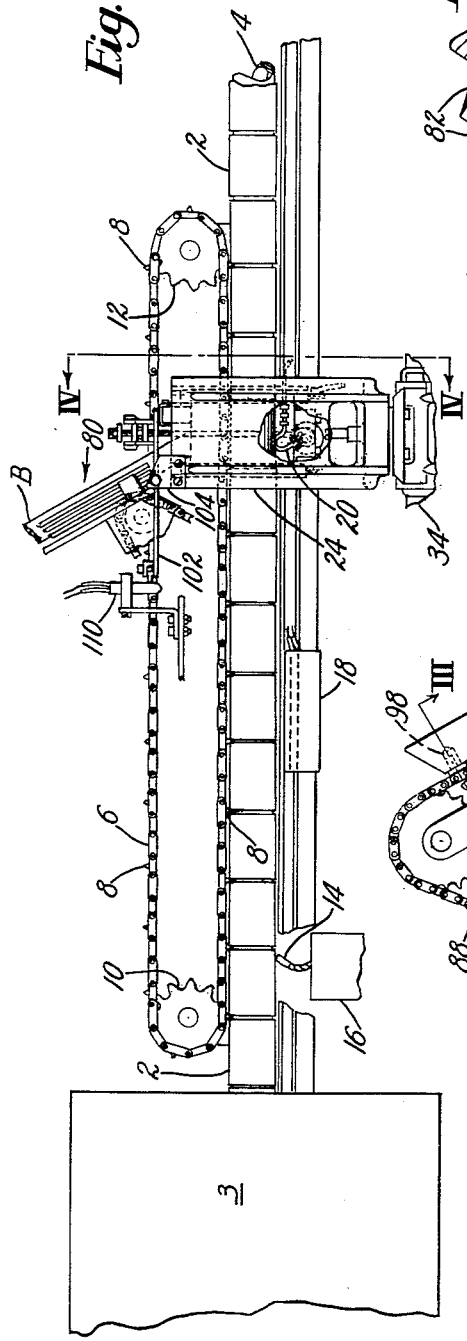
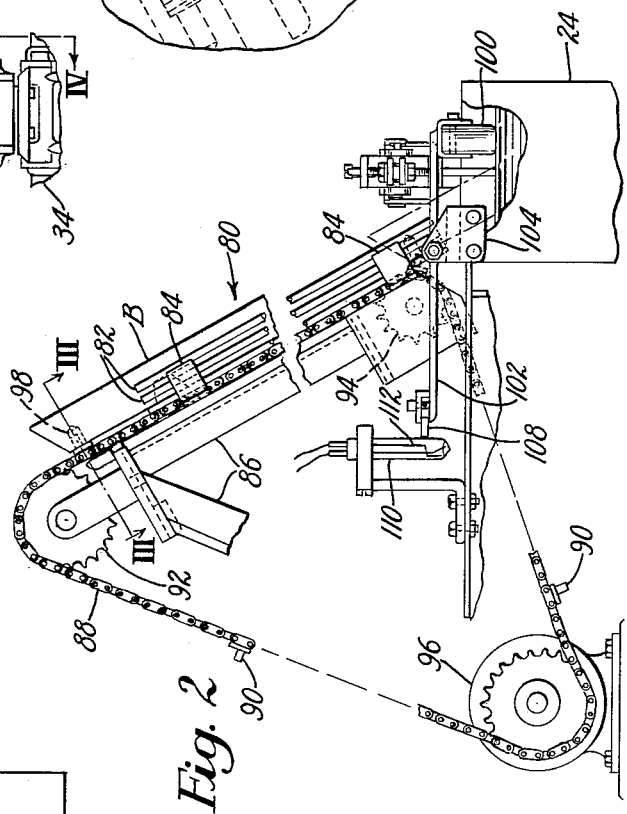
*Inventor*
*Frederick S. Sillars*
By his Attorney
*Thomas J. Ryan.*

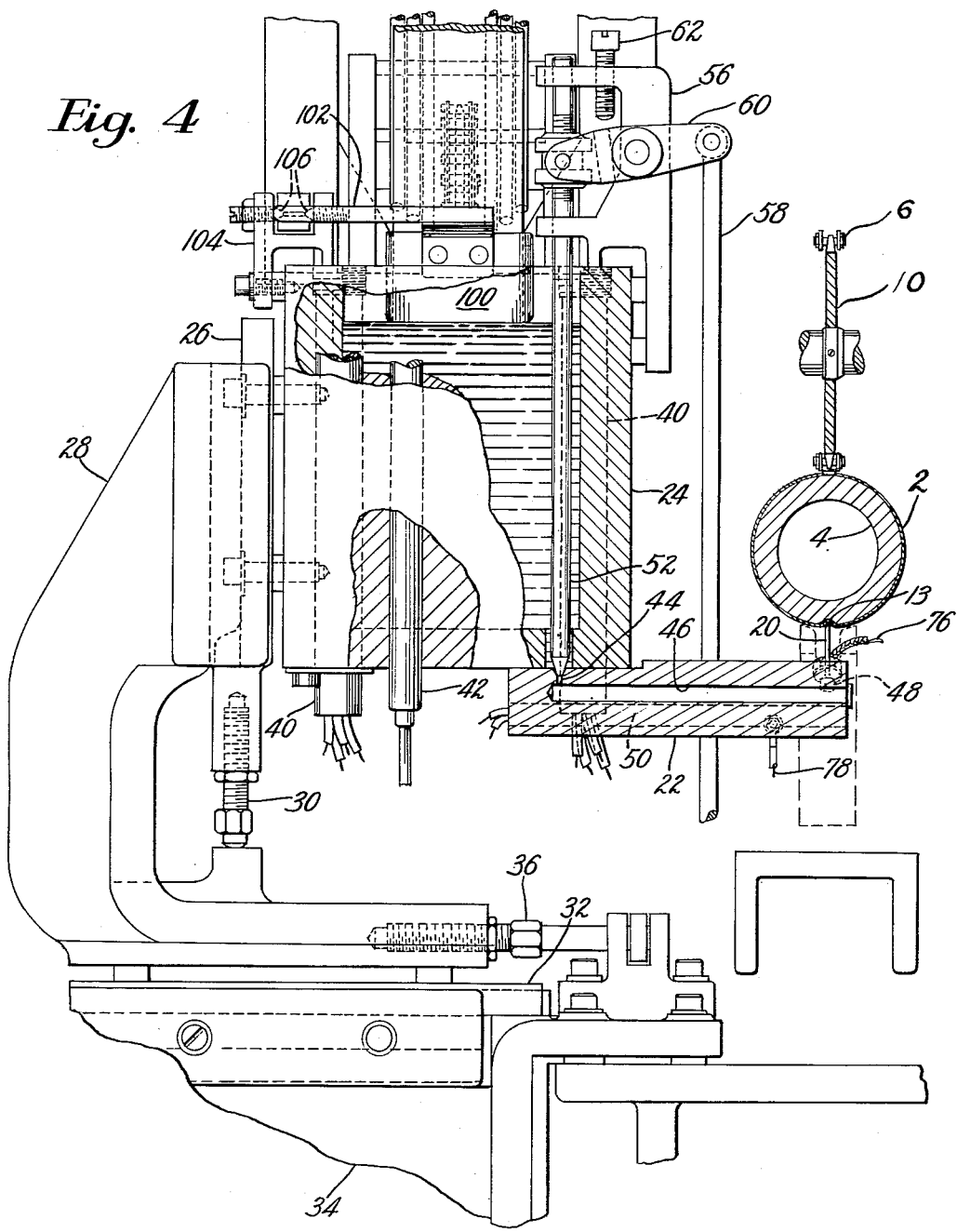

Sept. 19, 1961 F. S. SILLARS 3,000,338
METHOD AND APPARATUS FOR SOLDERING CANS
Filed Oct. 15, 1957 3 Sheets-Sheet 3
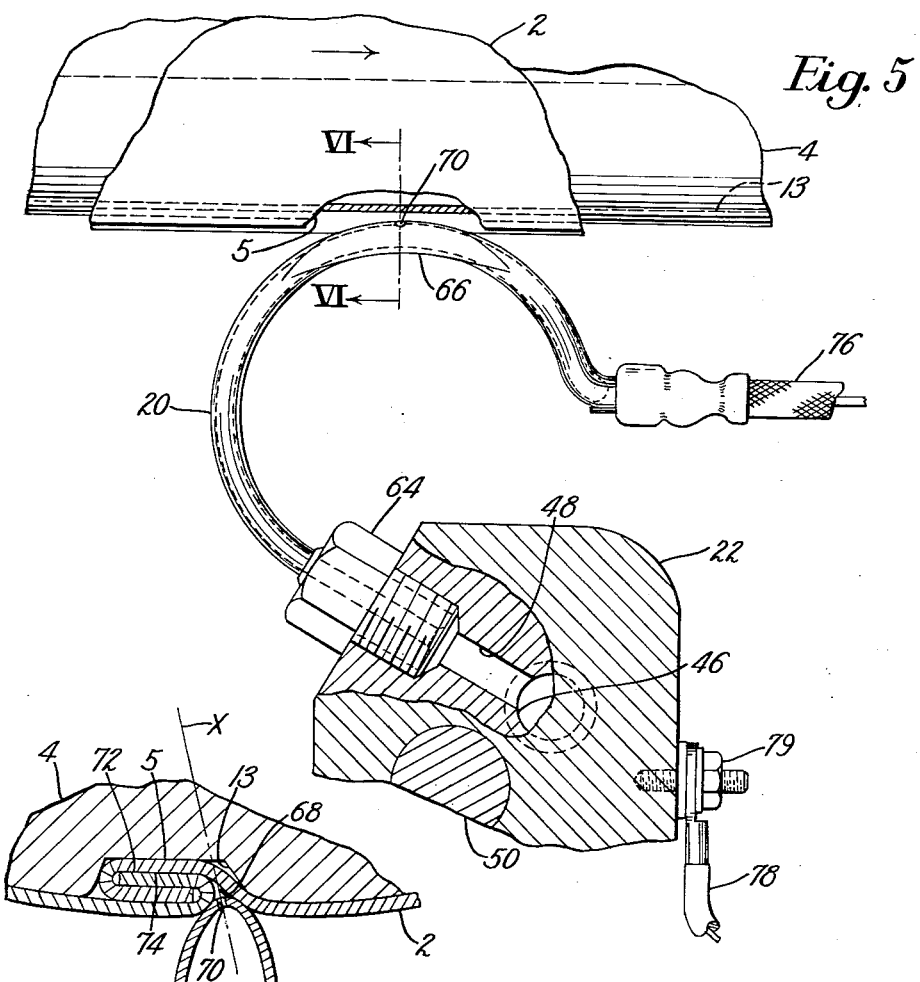
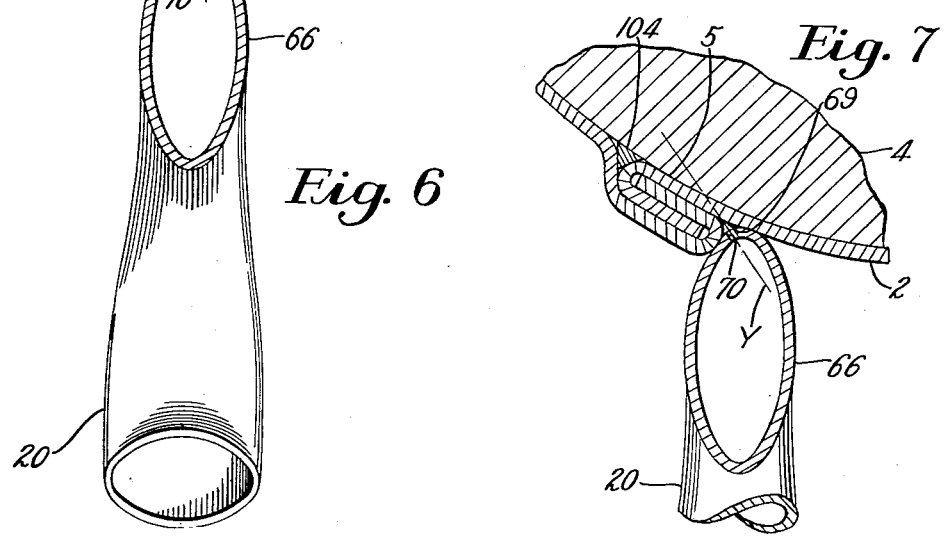

United States Patent Office 3,000,338
Patented Sept. 19, 1961

3,000,338
METHOD AND APPARATUS FOR
SOLDERING CANS
Frederick S. Sillars, Beverly, Mass., assignor, by mesne assignments, to Campbell Soup Company, Camden, N.J., a corporation of New Jersey
Filed Oct. 15, 1957, Ser. No. 690,247
20 Claims. (Cl. 113—60)

This invention relates to can making, and more specifically to a method and apparatus for soldering the side seams of partially fabricated metallic can bodies. One method of applying solder to the side seams of can bodies is by the use of a transfer roll which picks up molten solder from a trough and rotates it onto the seams as the cans are moved lengthwise of the roll. This method has a number of disadvantages. First, the solder is applied to an area extending a substantial distance on both sides of the longitudinal seam. Secondly, the quantity of solder applied by this method is two or three times the amount necessary to accomplish the intended job of sealing the superposed layers of body material forming the seam joint. This excess solder not only produces a can of undesirable appearance, but often must be removed before the cans can be further processed. Thirdly, the transfer roll, in picking up solder from the trough or solder reservoir, comes in contact with foreign matter in the form of oxides and slag which is inclined to accumulate on the surface. This requires that the upper surface of the molten solder be continuously scraped or cleaned of the foreign matter to prevent it from being transferred to the cans by the roll. Further, excessive heat is transferred to the cans by the roll which by necessity has substantially more mass than the can body. This contributes to undesirable can distortion in the form of seams which are concave axially of the can.

Another method of applying solder to the seams of can bodies entails projecting a jet of molten solder into space from a solder supply and directing the jet against the cans as they are fed past the solder receiving position. This method also has certain disadvantages. One is the difficulty of accurately maintaining the trajectory of the jet relative to the traveling can bodies to assure that solder strikes only the area where it is needed. Secondly, by projecting a jet of solder into space, opportunity is provided for the solder to cool and oxidize before it strikes the cans, both of which conditions are undesirable. Furthermore, by projecting a jet of solder against the can, portions of the solder splash and costly solder removing steps must be taken to assure that beads or other hardened portions of splashed solder are removed from the exterior and interior surfaces of the cans before they are filled. This is particularly undesirable where the cans are intended for containing foods.

It is an object of the present invention to provide a method and apparatus for soldering the side seams of partially fabricated can bodies which applies solder only in the area of the seam joints.

Another object of this invention is to provide an economical method and apparatus for soldering the side seams of partially fabricated can bodies which applies no more than the amount of solder necessary to seal the seam joint.

A further object is to provide a method and apparatus for soldering the side seams of can bodies which applies solder thereto which is free from oxides and other impurities.

Still another object is to provide a method and apparatus for soldering the side seams of partially fabricated can bodies which will not splash solder or cause it to accumulate in areas where it must be removed.

The side seams of most can bodies today comprise a seam joint with overlapping interlocked material on the inside of the can and a relatively smooth outer surface. On the outer surface, however, there appears a longitudinally extending V-shaped indentation or groove in the form of a re-entrant angle between the marginal portions of the can material forming the interlock. The transfer roll technique applies solder not only to this indentation but also to the can material extending marginally up to one half inch on both sides thereof. Applicant has found that if molten solder is conducted to a discharge point that is maintained at all times within the re-entrant grove of the moving can bodies and is allowed to flow under a constant pressure and temperature, extreme accuracy may be maintained in controlling the area which is covered by the solder. By this method solder does not extend to the marginal portion where it is not needed to seal the seam joint. Furthermore, by discharging solder from a point maintained within the re-entrant groove, the opportunity for the solder to cool and oxidize is reduced to a minimum. Furthermore, maintaining the solder discharge point in such close proximity to the surfaces to which the solder is to be applied facilitates the application of heat to the solder flowing thereto which is essential for maintaining the flow smooth and uniform.

To carry out this method and as a feature of the present invention, there is provided a machine for soldering the side seams of can bodies comprising means for moving the bodies along a predetermined path of travel with their side seams in substantial alignment and a flexible solder applying needle having an orifice in a solder discharging portion which is shaped to enter the re-entrant groove of the seam joints. Means are provided for locating the initial position of the discharge portion in respect to the can seams whereby said portion will remain in engagement with the side seams with the orifice in the grooves as the cans are moved relative to said needle. A solder reservoir is provided for melting solder and is connected to the nozzle by a series of passageways. The passageways confine the solder from exposure to air as it flows from the bottom of the reservoir, where it is free from oxides and slag, to the discharge portion of the nozzle which is maintained in the closest possible proximity to the surfaces to which the solder is applied. Control means are provided for maintaining the molten solder within the reservoir at a constant level thereby assuring that the solder being discharged from the nozzle is at a constant pressure. Thermostatically controlled heating means are provided to maintain the temperature of the solder constant in its passage from the reservoir to the point of discharge thereby assuring that the solder does not harden and impede its own flow.

The above and other features of the invention including various novel details of construction and combination of parts will now be more particularly described with reference to the accompanying drawings and pointed out in the claims.

In the drawings,

FIG. 1 is a side elevation with parts broken away of a can body soldering machine embodying, and for carrying out, the method steps of the present invention;

FIG. 2 is a side elevation on an enlarged scale of the solder feeding portion of the machine shown in FIG. 1;

FIG. 3 is a sectional view on an enlarged scale taken along the line III—III of FIG. 2;

FIG. 4 is a sectional view on an enlarged scale taken substantially along the line IV—IV of FIG. 1;

FIG. 5 is a detail view partially in section of a nozzle for applying solder to a seam joint;

FIG. 6 is a sectional view taken on the line VI—VI of FIG. 5; and

FIG. 7 is a view similar to FIG. 6 but showing a nozzle for applying solder to an alternative form of seam joint.

Bodies 2 of partially fabricated cans are formed in a body maker 3 of any conventional type and are conveyed therefrom along a stationary horn or mandrel 4 in a horizontal spaced end-to-end position with their side seams in solder receiving alignment at the bottoms of the bodies. The supported bodies are moved along the mandrel 4 in a continuous procession in a timed and spaced order by an endless chain 6 having feed dogs 8 located at intervals thereon, each dog engageable with the upper trailing edge of one can body. The chain 6 is mounted above the mandrel 4 and passes over sprocket wheels 10, 12 rotated in counterclockwise directions as seen in FIG. 1. The interlocked body material which forms the seam joint 5 of each body fits within a longitudinal groove or slot 13 (FIGS. 4 and 6) formed in the bottom of the mandrel 4 which maintains the seams in alignment as the bodies are moved lengthwise of the mandrel. Soldering flux is applied to the seam joints 5 in the body maker 3 or by any other convenient means, as for example, by a wick 14 extending from a flux container 16. The can bodies are brought to soldering temperature by heating mechanism, likewise of any convenient type, and shown in FIG. 1 as an electrical induction type heater 18.

Solder is applied from a nozzle in the form of a curved needle 20 to a precise and controlled area of the side seam of each of the can bodies as the bodies progress lengthwise of the mandrel 4. The needle 20 is mounted below the mandrel on an arm 22 (FIG. 4) extending from the bottom of a solder reservoir 24 transversely of the axis of the mandrel. The reservoir, which is constructed of heat resistant material and may, if desired, have a ceramic lining is secured to a slide 26 which is adjustable heightwise relatively to a C-shaped supporting bracket 28 by an adjusting screw 30. The bracket 28 in turn is secured to a slide 32 which is adjustable horizontally relatively to the machine frame 34 by an adjusting screw 36. Thus, the position of the needle 20 may be adjusted horizontally and vertically by the screws 30 and 36 relatively to the mandrel 4, which is stationary, while its position relatively to the reservoir 24 remains unchanged.

In each corner of the reservoir 24 there is located a heater 40 for melting solder which is supplied to the reservoir in solid form. Also inserted in the reservoir is a thermostatic unit 42, which through appropriate control mechanism, not shown, maintains the temperature of the heaters 40 and consequently of the reservoir and its contents of molten liquid solder at the desired temperature. Liquid solder flows by gravity from the bottom of the reservoir 24, where it is free of oxide and slag, to the needle 20 through an airtight passage comprising connecting passageways 44, 46 and 48 in the arm 22. A heater 50, also under control of the thermostatic unit 42, maintains the arm 22 and the solder in the above-mentioned passageways at the desired temperature. The flow of solder from the bottom of the reservoir 24 into the passageway 44 is controlled by a needle valve 52 slidably mounted in a bracket 56 on the reservoir 24. Vertical movement of the needle valve 52 is obtained through a control rod 58 attached to a treadle or other operating mechanism, not shown, and a lever 60 pivotally attached to the rod 58 and the valve 52. Clockwise movement of the lever 60, as seen in FIG. 4, resulting in heightwise movement of the needle valve 52 to release solder to the needle 20 is limited by a set-screw 62 threaded in the bracket 56.

Referring to FIGS. 5 and 6, the needle 20 is generally arcuate in shape being constructed of resilient seamless tubular material such as stainless steel. One end of the needle is threaded in the rigid arm 22 in airtight communication with the passageway 48 and is held in position by a lock nut 64. The solder discharging portion 66 of the needle is spaced from the nut 64 and has the smallest cross sectional area. As seen in FIG. 6, this discharging area is substantially elliptical and shaped to enter the re-entrant angle 68 of the seam joint 5. The re-entrant angle 68 forms the longitudinal groove or indentation between the marginal portions of the can material leading to the interlocked portion of the seam joint 5. This type of configuration, known either as a re-entrant angle or re-entrant groove, includes that portion of the figure inwardly of the can's outermost perimeter measured radially. The outward extent of the re-entrant groove is defined by the outer limits of the can surface adjacent the groove or by a plane tangent to the can on both sides of the groove. The resilient needle being arcuate and clamped at only one end is capable of being urged yieldingly upward toward the mandrel 4 so that the upper periphery of the discharge portion 66 occupies a position within the re-entrant angle 68 of the seam joint 5. The force with which the needle 20 bears against the seam joint is controlled by raising or lowering the solder reservoir 24 and its affixed arm 22 relatively to the mandrel by the adjusting screw 30. Formed in the discharging portion 66 of the needle 20 is an orifice 70 through which solder flows into the re-entrant angle 68 of the seam joint 5 and thence along the superposed surfaces 72, 74 of the joint by capillary action. The orifice 70 is formed on an axis X which is inclined to the vertical, substantially bisecting the re-entrant angle 68. The opposite or free end of the needle 20 is closed and attached thereto is a wire 76. A second wire 78 is attached to the arm 22 by a conventional terminal clamp 79. The wires 76 and 78 are connected to a source of E.M.F. for passing current through the needle 20 to cause it to be heated. Since the minimum cross sectional area occurs at the discharge area 66, and particularly through the orifice 70, a concentration of heat occurs at this point. This assures that the solder will be maintained, as it passes through the needle, at the desired flowing and soldering temperature reducing the possibility of clogging of the orifice 70.

FIG. 6 shows the conventional form of a seam joint with the overlapped marginal portions of the can body on the inside of the can. However, should it be desired to form the seam joint on the outside of the can, as seen in FIG. 7, or should the seam be a straight lap joint, the method and apparatus is substantially the same. The upper edge of the solder discharging portion 66 still rides within the corresponding re-entrant angle or groove 69 of the seam joint 5. However, the axis of the orifice 70 which bisects the re-entrant angle would be changed slightly as shown by the axis Y in FIG. 7. Cans with external seam joints may be oriented during soldering with the joints in alignment along the bottom of the mandrel whereupon the needle 20 would be inclined to the horizontal to facilitate entry into the re-entrant angle. However, it is preferable to maintain the needle in vertical alignment and the seam joints aligned somewhat above the bottom of the mandrel, as seen in FIG. 7, this position being controlled by the location of a longitudinally extending guide strip 104 instead of the slot 13 shown in FIG. 6.

Because the discharge portion 66 of the needle is shaped to enter the re-entrant groove and because the orifice is formed at a point where its axis substantially bisects the re-entrant angle, the point of discharge of solder is at all times maintained within the re-entrant groove at a point as close to the superposed surfaces 72, 74 as is possible. This causes solder to be applied to a precise and controlled area, and also prevents it from being exposed to air from the time it leaves the bottom of the reservoir to the time when it is delivered to the seam joint. Similarly, by applying heat to the solder right up to the point where it is released within the re-entrant angle, the possibility of cooling is reduced to a minimum.

Solder is fed to the machine in the form of ingots, generally three or more ingots forming a bar B having a cross section as shown in FIG. 3. A guideway 80 (FIG. 2) is mounted on the reservoir 24 to direct the bar of solder downwardly into the upper open end of the reservoir. The guideway 80 comprises a plurality of spaced rods 82 secured to clamping brackets 84 which in turn are mounted on a frame 86. Passing between the brackets 84 of the guideway 80 is an endless chain 88 mounting a plurality of spaced lugs 90. The chain 88 passes over sprocket wheels 92 and 94 journaled in the frame 86 and is controlled by a motor 96 which may be mounted at any convenient place on the machine frame. Each of the lugs 90 is arranged to engage a hole 98 bored in the endmost ingot of the solder bar. A bar is placed in the guideway 80 as seen in FIGS. 2 and 3 and is fed downwardly into the reservoir 24 by gravity, being retarded in its movement by the lugs 90 on the chain 88 which is caused to move in a clockwise direction as seen in FIG. 2 by the motor 96. When the upper end of the bar B reaches the lower end of the guideway 80, as illustrated in phantom in FIG. 2, its engaging lug 90 is retracted from the hole 98 as the chain passes around the sprocket wheel 94, the remainder of the bar then sliding into the reservoir 29.

The speed of the motor 96 is controlled so that the height of the solder within the reservoir is maintained substantially constant. A float 100 of ceramic or other non-inflammable heat resisting material weighing less than a comparable volume of liquid solder is pivoted on an L-shaped lever 102 which extends away from the mandrel 4 as viewed in FIG. 4 and toward the left of the machine as viewed in FIG. 1. The lever 102 is pivoted in a bracket 104 secured to the upper edge of the reservoir 24 on a pair of adjustable pivot pins 106. Clamped to the opposite end of the lever 102 is a magnet 108. A mercury switch 110 of conventional design, having a pivotal ferromagnetic electrode 112, is mounted adjacent the magnet 108 and is arranged so that the movement of the magnet 108 causes the pivotal electrode to make and break an electric circuit. The switch 110 is connected in series with the motor 96. Thus as molten solder is drawn from the bottom of the reservoir and the float 100 is lowered, the mercury switch 110 is closed and the motor 96 is operated to permit the bar B of solder to advance downwardly of the guideway 80 to be melted. The level of the solder within the reservoir 24 is thus maintained at a substantially constant height above the needle thereby assuring that solder under a constant pressure flows from the orifice 70 of the needle 20.

Having thus described my invention, what I claim as new and desire to secure by Letters Patent of the United States is:

1. In a machine for soldering the side seams of can bodies each of which has a seam joint including a re-entrant groove, the combination of means for moving bodies along a predetermined path of travel with their side seams in substantial alignment, a resilient solder applying needle having a discharge portion including an orifice, and means mounting said needle for locating the initial position of said discharge portion in respect to the can side seam path whereby said portion will remain in engagement with the side seams of the moving can bodies with the orifice in the grooves.

2. In a machine for soldering the side seams of can bodies each of which has a seam joint including a re-entrant groove, the combination of means for moving bodies along a predetermined path of travel with their side seams in substantial alignment, a resilient solder applying needle having a discharge portion including an orifice, means mounting said needle for locating the initial position of said discharge portion in respect to the can side seam path whereby said portion will remain in engagement with the side seams of the moving can bodies with the orifice in the grooves, and means for supplying melted solder to said applying nozzle under a substantially constant pressure.

3. In a machine for soldering the side seams of can bodies each of which has a seam joint including a re-entrant groove, the combination of means for moving bodies along a predetermined path of travel with their side seams in substantial alignment, a resilient solder applying needle having a discharge portion including an orifice, means mounting said needle for locating the initial position of said discharge portion in respect to the can side seam path whereby said portion will remain in engagement with the side seams of the moving can bodies with the orifice in the grooves, a solder reservoir connected to said nozzle for delivering melted solder thereto by gravity, means for melting solder in said reservoir, means for feeding solder to said reservoir, and means for controlling the rate of feed of the solder to said reservoir to maintain the melted solder therein at a substantially constant level.

4. In a machine for soldering the side seams of can bodies each of which has a seam joint including a re-entrant groove, the combination of means for moving can bodies along a predetermined path of travel with their side seams in substantial alignment, a resilient solder applying needle having a discharge portion including an orifice, means mounting said needle for locating the initial position of said discharge portion in respect to the can side seam path whereby said portion will remain in engagement with the side seams of the moving can bodies with the orifice in the grooves, a solder reservoir connected to said nozzle for delivering melted solder thereto by gravity, means for melting solder in said reservoir, means for feeding solder to said reservoir comprising a guideway for supporting solder for downward sliding movement into said reservoir, and means responsive to the level of melted solder in the reservoir for controlling the rate of movement of the solder thereinto to maintain the melted solder at a substantially constant level relative to said applying nozzle.

5. In a machine for soldering the side seams of can bodies each of which has a seam joint including a re-entrant groove, the combination of means for moving bodies along a predetermined path of travel with their side seams in substantial alignment, a nozzle for applying melted solder to the seams of the moving can bodies, said nozzle comprising a resilient hollow needle having a solder discharging portion including an orifice, means for passing electrical current through the needle to heat said needle and the melted solder therein, and means mounting said needle for locating the initial position of the discharging portion in respect to the can side seam path whereby said portion will remain in engagement with the side seams of the moving can bodies with the orifice in the grooves.

6. In a machine for soldering the side seams of can bodies each of which has a seam joint including a re-entrant groove, the combination of means for moving bodies along a predetermined path of travel with their side seams in substantial alignment, a nozzle for applying melted solder to the seams of the moving can bodies, said nozzle comprising a resilient hollow needle having a solder discharging portion including an orifice, the discharging portion of said needle having the smallest cross sectional area, means for passing electrical current through said needle to heat said needle, said smallest cross sectional area of the discharging portion concentrating heat at said discharging portion, and means mounting said needle for locating the initial position of the discharging portion in respect to the can side seam path whereby said portion will remain in engagement with the side seams of the moving can bodies with the orifice in the grooves.

7. In a machine for soldering the side seams of can bodies each of which has a seam joint including a re-entrant groove, the combination of means for moving bodies along a predetermined path of travel with their side seams in substantial alignment, a nozzle for applying melted solder to the seams of the moving can bodies, said nozzle comprising a resilient hollow needle having a solder discharging portion, means rigidly mounting one end of said needle, the solder discharging portion of said needle being spaced from the rigidly mounted end and having a reduced cross section with a discharge orifice formed therein, and means for adjusting said mounting means to locate the initial position of said reduced cross section of the discharging portion in respect to the can side seam path whereby the portion having the reduced cross section will remain yieldingly in engagement with the seams of the moving can bodies with the orifice in the grooves.

8. In a machine for soldering the side seams of can bodies each of which has a seam joint including a re-entrant groove, the combination of means for moving bodies along a predetermined path of travel with their side seams in substantial alignment, a nozzle for applying melted solder to the seams of the moving can bodies, said nozzle comprising a resilient hollow needle having a solder discharging portion, means rigidly mounting one end of said needle, the solder discharging portion of said needle being spaced from the rigidly mounted end and having a reduced cross section with a discharge orifice formed therein, means for adjusting said mounting means to locate the initial position of said reduced cross section of the discharging portion in respect to the can side seam path whereby the portion having the reduced cross section will remain yieldingly in engagement with the seams of the moving can bodies with the orifice in the grooves, and means for passing electrical current through said needle to heat said needle, said reduced cross sectional area of the discharging portion concentrating heat in the area of said discharge orifice.

9. In a machine for soldering the side seams of can bodies each of which has a seam joint including a re-entrant groove, the combination of means for moving bodies along a predetermined path of travel with their seam joints in substantial alignment, a resilient solder applying needle having a solder discharging portion shaped to enter said re-entrant groove within the outer limit of the can surface adjacent said groove, an orifice in the discharging portion, and means mounting said needle for locating the initial position of said discharging portion in respect to the can side seam path whereby said portion will remain in engagement with the side seams of the moving can bodies with said orifice within the grooves.

10. In a machine for soldering the side seams of can bodies each of which has a seam joint including a re-entrant groove, the combination of means for moving bodies along a predetermined path of travel with their seam joints in substantial alignment, a nozzle for applying melted solder to the seam joints of the moving can bodies comprising a resilient hollow needle having a solder discharging portion shaped to enter the re-entrant groove within the outer limit of the can surface adjacent said groove, a discharge orifice formed in said discharging portion, and means mounting said needle for locating the initial position of said discharging portion in respect to the side seam path whereby said portion will remain in engagement with the side seams of the moving can bodies with the orifice within the grooves and whereby solder will be discharged directly into said seam joints.

11. In a machine for soldering the side seams of can bodies each of which has a seam joint including a re-entrant groove, the combination of means for moving bodies along a predetermined path of travel with their seam joints in substantial alignment, a nozzle for applying melted solder to the seam joints of the moving can bodies comprising a resilient hollow needle having a solder discharging portion, means rigidly mounting one end of said needle, the discharge portion being spaced from said rigidly mounted end and substantially elliptical in cross section to facilitate entry into said re-entrant groove within the outer limit of the can surface adjacent said groove, a discharge orifice formed in said discharging portion, and means for adjusting said mounting means to locate the initial position of said discharging portion in respect to the side seam path whereby the elliptical section will remain in engagement with the side seams of the moving can bodies with the orifice within the grooves and whereby solder will be discharged directly into said seam joints.

12. In a machine for soldering the side seams of can bodies each of which has a seam joint including a re-entrant groove, the combination of means for moving can bodies along a predetermined path of travel with their seam joints in substantial alignment, a nozzle for applying melted solder to the seam joints of the moving can bodies comprising a resilient hollow curved needle having a solder discharging portion, means rigidly mounting one end of said needle, the discharge portion being spaced from said rigidly mounted end and having a reduced cross section of substantially elliptical shape to facilitate entry into said re-entrant groove, a discharge orifice formed in said reduced cross section, means for adjusting said mounting means to locate the initial position of said discharging portion in respect to the side seam path whereby the elliptical section will remain in engagement with the side seams of the moving can bodies with the orifice within the grooves and whereby solder will be discharged directly into said seam joints, and means for passing electrical current through said needle to heat said needle, said reduced cross sectional area of the discharge portion concentrating heat at said discharge orifice whereby solder may be discharged directly into said seam joint.

13. In a machine for soldering the side seams of can bodies each of which has a seam joint including a re-entrant groove, the combination of means for moving can bodies along a predetermined path of travel with their seam joints in substantial alignment, a resilient solder applying needle having a solder discharging portion shaped to enter the re-entrant groove, a solder discharging orifice in said discharging portion formed on an axis substantially bisecting said re-entrant angle, and means mounting said needle for locating the initial position of said discharging portion in respect to the side seam path whereby said portion will remain in engagement with the side seams of the moving can bodies with the orifice within the grooves and whereby solder will be discharged directly into said seam joints.

14. The method of soldering the side seam of a can body which has a seam joint including a re-entrant groove comprising, in combination, the steps of moving the can body along a predetermined path of travel and projecting a flow of melted solder into said seam joint from a discharge point maintained in the re-entrant groove within the outer limit of the can surface adjacent said groove and inwardly of a plane tangent to the can on both sides of said groove.

15. The method of soldering the side seams of can bodies which have seam joints each including a re-entrant groove comprising, in combination, the steps of moving the can bodies along a predetermined path of travel with their seam joints in substantial alignment, conducting a flow of melted solder to a discharge point, maintaining said discharge point in the re-entrant groove within the outer limit of the can surface adjacent said groove of each of the seams of the moving can bodies, and directing solder from said discharge point in a direction substantially bisecting each of said re-entrant grooves and inwardly of a plane tangent to the cans on both sides of said grooves.

16. The method of soldering the side seams of can bodies which have seam joints each including a re-entrant groove comprising, in combination, the steps of moving the can bodies along a predetermined path of travel with their seam joints in substantial alignment, providing a supply of melted solder, conducting solder from said supply to a discharge point, confining solder from exposure to atmosphere, while it is conducted from said supply to said discharge point to prevent oxidation, and maintaining said discharge point within each of said re-entrant grooves within the outer limits of the can surfaces adjacent said grooves and inwardly of a plane tangent to the cans on both sides of said grooves as the can bodies are moved relatively thereto.

17. The method of soldering the side seams of can bodies which have seam joints each including a re-entrant groove, comprising, in combination, the steps of moving the can bodies along a predetermined path of travel with their seam joints in substantial alignment, providing a supply of melted solder, conducting solder from said supply to a discharge point, applying heat to said conducted solder at all times during its passage from said supply to said discharge point to prevent the solder from solidifying, and maintaining said discharge point within each of said re-entrant grooves within the outer limits of the can surfaces adjacent said grooves and inwardly of a plane tangent to the cans on both sides of said grooves as the can bodies are moved relatively thereto.

18. The method of soldering the side seams of can bodies which have seam joints each including a re-entrant groove comprising, in combination, the steps of moving the can bodies along a predetermined path of travel with their seam joints in substantial alignment, providing a supply of melted solder, conducting solder from said supply to a discharge point, maintaining a concentration of heat at said discharge point, and maintaing said discharge point within each of said re-entrant grooves within the outer limits of the can surfaces adjacent said grooves and inwardly of a plane tangent to the cans on both sides of said grooves as the can bodies are moved relatively thereto.

19. In a soldering machine, a resilient solder applying needle having a discharge portion, means for supporting a work piece having a seam to be soldered, means for effecting relative movement between the work piece and the needle, and means mounting said needle for locating the initial position of said discharge portion in respect to the seam of the work piece whereby said portion will remain in engagement with the side seam during said relative movement.

20. In a machine for soldering an article having a grooved joint, a resilient solder applying needle having a discharge portion shaped to enter said groove, means for effecting relative movement between the needle and the article, and means mounting said needle for locating the initial position of said discharge portion in respect to the grooved joint of the article whereby the discharge portion will remain in engagement with the grooved joint and solder will be discharged directly into said joint.

References Cited in the file of this patent

UNITED STATES PATENTS

| | | |
|---|---|---|
| 925,045 | Smith | June 15, 1909 |
| 1,520,645 | Grevers et al. | Dec. 25, 1924 |
| 1,609,844 | Swanson | Dec. 7, 1926 |
| 1,928,129 | Hornack | Sept. 26, 1933 |
| 2,415,542 | Vawryk | Feb. 11, 1947 |
| 2,469,392 | Jones et al. | May 10, 1949 |
| 2,597,893 | Nordquist | May 27, 1952 |